3,200,173
PROCESS FOR PREPARING BLENDS OF POLYPROPYLENE WITH COPOLYMERS OF ETHYLENE AND PROPYLENE

William M. Schilling, West Chester, Pa., assignor to Hercules Powder Company, Wilmington, Del., a corporation of Delaware
No Drawing. Filed Feb. 8, 1960, Ser. No. 7,105
8 Claims. (Cl. 260—878)

The present invention relates to an improved process for the preparation of blends of polypropylene with copolymers of ethylene and propylene.

Solid, high-molecular weight polymers of propylene have recently been developed and already these polymers have shown great promise in the plastics industry. The crystalline type of polypropylene, which can be termed stereoregular polypropylene, is already being produced commercially in large quantities and is finding acceptance for the manufacture of fibers, films, and molded articles. However, one of the disadvantages of stereoregular polypropylene is that it becomes brittle at low temperatures. Thus, for instance, bottles fabricated of stereoregular polypropylene when cooled, for example, to below 0° C. may fracture upon being dropped on a hard floor.

Much work has been done to lower the brittleness temperature of stereoregular polypropylene and a large portion of this work has involved blending the polypropylene with another polymer that does not possess as great a tendency to become brittle at low temperatures. It has been found by other investigators, for instance, that blends of stereoregular polypropylene with a copolymer of ethylene and propylene have a much reduced tendency to become brittle at low temperatures as compared to polypropylene. The copolymers most useful for this purpose are those that contain from about 3 to 15 mole percent propylene and they are used preferably in the amount of from 10 to 60% by weight of the blend.

It is of course possible to make blends of stereoregular polypropylene and the aforesaid copolymers simply by mixing the two. This, however, requires that the polymer and copolymer be separately prepared. The most common method for preparing polypropylene and copolymers of ethylene and propylene is to conduct the polymerization by passing the gaseous monomer or monomers, as the case may be, into an inert liquid organic diluent in the presence of a so-called Zeigler catalyst, i.e., a combination of a compound of a metal of Groups IV–B, V–B, VI–B, or VIII of the Periodic Table or manganese, with an organometallic compound of an alkali metal, alkaline earth metal, zinc, aluminum, or rare earth metal, and recovering the solid polymer from the resulting slurry. Although stereoregular polypropylene can be produced feasibly by this method, the production of copolymers of ethylene and propylene that contain from 3 to 15 mole percent propylene by the same method requires an inordinately high ratio of diluent to copolymer to enable recovery of the copolymer. The apparent reason for this is that the copolymers of the above description swell under the influence of the diluent, thereby resulting in a reaction slurry that, at feasible solids concentration, is difficult to filter and process.

In accordance with the present invention it has been found that in making blends of stereoregular polypropylene with copolymers of ethylene and propylene that contain from 3 to 15 mole percent of the latter, a very advantageous procedure is to conduct both the copolymerization and the homopolymerization sequentially, in indifferent order, in the same diluent, and then separate a blend of polypropylene and copolymer from the diluent. One of the principal advantages of this procedure is that it makes possible the production in situ of a blend of stereoregular polypropylene and ethylene-propylene copolymer with the attainment of a relatively high ratio of total polymer to diluent. It appears that this is due in large measure to the fact that the presence of polypropylene in the reaction slurry reduces the handling and filtering difficulties that are normally encountered in the preparation of the copolymer alone at the same ratio of polymer to diluent.

Stating the invention more precisely it comprises, in indifferent order, the steps of copolymerizing ethylene and propylene and polymerizing propylene by passing gaseous olefin into an inert liquid organic diluent in the presence of a catalyst comprising a combination of a compound of a metal of Groups IV–B, V–B, VI–B, or VIII of the Periodic Table or manganese and an organometallic compound of an alkali metal, alkaline earth metal, zinc, aluminium or rare earth metal to form a reaction slurry containing a solid copolymer of ethylene and propylene containing 3 to 15 mole percent of propylene and a solid stereoregular homopolymer of propylene, and thereafter separating from the ultimate reaction slurry a blend of said polypropylene and said copolymer in which blend the copolymer comprises about 10 to 60% by weight.

The following examples are presented as illustrations of the invention. Parts and percentages are by weight unless otherwise specified. The term "RSV" refers to reduced specific viscosity which is the specific viscosity, corrected to zero shear gradient, divided by concentration of a 0.1% solution of the polymer in decahydronaphthalene, containing 0.1 g. of the polymer per 100 ml. of the solution, at 135° C.

EXAMPLES 1 AND 2

In these examples the reaction vessel employed for polymerization was a jacketed, glass-lined autoclave equipped with an agitator. At the beginning of each run there was charged to the autoclave ten liters of saturated aliphatic hydrocarbon diluent boiling in the range of 200–230° C. The autoclave was then sealed and purged with 10 cu. ft. of nitrogen while agitating and heating to polymerization temperature of 50° C. There was then added 200 mmoles of diethylaluminum chloride as a 1.8 M solution in n-heptane and agitation continued for ten minutes. There was next injected into the autoclave 100 mmoles of $TiCl_3$ as a 0.5 M suspension in the above diluent and agitation was continued for an additional ten minutes thereafter.

The first stage of polymerization was started by feeding ethylene, propylene and hydrogen at a predetermined volume ratio into the autoclave at the combined rate of 500 g. per hour. The copolymerization of ethylene and propylene was continued for 45 minutes at which point 37.5 g. of the combined monomers per liter of diluent had been introduced into the autoclave. The introduction of monomers was then terminated but the reaction conditions were maintained until ethylene was no longer detectable in the off-gas by gas chromatography.

After completing the first stage, the temperature of the reaction mixture was raised to 60° C. and propylene containing 0.9 mole percent hydrogen was fed to the reactor at the rate of 500 g. per hour. The feeding and polymerization of propylene was continued until the total amount of all monomers fed to the autoclave in both the first and second stages amounted to 250 g. per liter of diluent.

The above procedures resulted in the formation of reaction slurries from which blends of polypropylene and ethylene-propylene copolymer were recovered. This was accomplished by emptying the reaction slurry into a nitrogen-filled vessel containing 400 ml. of butanol. This mixture was stirred for one hour at 50° C. under nitrogen after which there was added 2500 ml. 4% aqueous sodium hydroxide, and 25 ml. 50% aqueous gluconic acid. The resulting mixture stirred for one hour at room temperature open to the air. Next, the mixture was allowed to settle and the water layer decanted and discarded. The organic layer was washed until neutral with water and then filtered. During filtration the slurries behaved substantially the same as does slurry of stereoregular polypropylene of the same concentration, no particular difficulties being encountered. The filter cakes comprising a blend of polypropylene and ethylene-propylene copolymer were charged to a steam-jacketed kettle along with 20 liters of water and distilled therein by sparging with steam to remove occluded diluent. Following steam distillation the blends were washed with water until neutral and then dried.

Further details of the examples and the products are as follows:

Table I

|  | Example 1* | Example 2** |
|---|---|---|
| $C_2H_4/C_3H_6/H_2$ volume ratio during copolymerization | 93/7/0.2 | 93/7/0.8 |
| Cumulative percent $C_3H_6$ in feed | 86.5 | 86.5 |
| Polymer (g.) per liter diluent | 236 | 187 |
| Bulk density of polymer blend (g./ml.) | 0.351 | 0.345 |
| RSV of polymer blend | 5.8 | 4.7 |
| Combined $C_3H_6$ (percent) | 93 | 83 |

*Blend of approximately 84% polypropylene and 16% copolymer by weight containing 7 mole percent propylene.
**Blend of approximately 80% polypropylene and 20% copolymer containing 7 mole percent propylene.

Physical properties of the polymer blends were as follows:

Table II

|  | Example 1 | Example 2 | Stereoregular Polypropylene (RSV =3-4) |
|---|---|---|---|
| Flexural strength (p.s.i.) | 5,900 | 6,800 | 9,000 |
| Stiffness in flexure (p.s.i.) | 120,000 | 145,000 | 190,000 |
| Torsional rigidity, 120° C. (p.s.i.) | 1,300 | 2,000 | 2,700 |
| Rockwell hardness | 62 | 81 | 95 |
| Falling wt. impact (in.): |  |  |  |
| Disks, 23° C | 60 | 55 | 35 |
| Disks, 0° C | 54 | 17 | 3 |
| Disks, −20° C | 42 | <5 | <3 |

By way of contrast with the polymer blends made in the preceding examples a copolymer of 93 mole percent ethylene and 7 mole percent propylene prepared in the same way to give a concentration of 209 g. copolymer per liter of diluent resulted in an extremely viscous, gelatinous reaction slurry that was very difficult to filter or otherwise work up.

The embodiment of the invention illustrated in the examples is characterized by first copolymerizing ethylene and propylene in an inert diluent to form a relatively small amount of a copolymer containing from about 3 to 15 mole percent propylene and then homopolymerizing propylene in the same reaction mixture to form a relatively large amount of stereoregular polypropylene, and then separating a blend of polypropylene and copolymer. It is obvious, of course, that the order of polymerization and copolymerization may be reversed. By either sequence there is obtained a final reaction slurry from which the polymer blend can be recovered by simple techniques such as filtration, washing, and steam distillation. The blends obtained are similar in properties to those obtainable by preparing the copolymer and polypropylene separately and then admixing the two and they possess the advantage over stereoregular polypropylene of being less brittle, particularly at low temperatures. The proportion of polypropylene and copolymer in the blend may vary considerably but for the purpose of the invention will range from about 10 to 60% copolymer by weight.

Suitable reaction techniques, catalysts, diluents, and other process details are already known to the art. In accordance with the art, the olefin (or olefins) is contacted at relatively low pressure and temperature with a catalyst prepared by mixing a compound of a metal of Groups IV-B, V-B, VI-B or VIII of the Periodic Table or manganese with an organometallic compound of an alkali metal, alkaline earth metal, zinc or aluminum. The so-called transition metal compound may be an inorganic salt such as a halide, oxyhalide, etc., or an organic salt or complex such as an acetylacetonate, etc. Exemplary of the transition metal compounds that may be used are titanium and zirconium tetrachlorides, titanium trichloride, manganous chloride, nickelous chloride, ferrous chloride, ferric chloride, tetrabutyl titanate, zirconium acetylacetonate, vanadium oxyacetylacetonate, chromium acetylacetonate, etc. The organometallic compound that is employed in combination with one of the transition metal compounds or mixtures thereof may be any organo compound of an alkali metal, alkaline earth metal, zinc, aluminum, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

Another method of carrying out the polymerization is to use a catalyst system in which the insoluble precipitate which is formed by mixing a transition metal compound, e.g., $TiCl_4$, and an organometallic compound as described above is separated and then used in combination with an additional organometallic compound. The insoluble reaction product will be readily separated, if the reaction took place in an inert diluent, from the diluent and soluble reaction by-products by centrifuging, filtering, or any other desired means. In some cases it may be desirable to wash the insoluble reaction product with additional amounts of hydrocarbon diluent in order to completely remove all of the soluble by-products. This hydrocarbon-insoluble reaction product is then used in combination with any organometallic compound of a metal selected from the group of alkali metals, alkaline earth metals, zinc, aluminum, and rare earth metals, which compounds have already been exemplified above. This second catalyst component may be the same organometallic compound that was used in preparing the insoluble reaction product catalyst component or it may be a different organometallic compound. Of particular advantage is the use of such a hydrocarbon-insoluble reaction product in combination with a dialkylaluminum halide such as diethylaluminum chloride, diisobutylaluminum bromide, etc.

In another two-component catalyst system, the whole reaction mixture formed on mixing a transition metal compound and an organometallic compound may be used in combination with an additional organometallic compound, if the latter is halogen-free. This two-component catalyst system is particularly useful for the polymerization of linear 1-olefins. Suitable halogen-free organometallic compounds that may be used as the second catalyst component in this system are alkali metal alkyls such as butyllithium, amyl sodium, etc., dialkylmagnesium compounds such as dimethylmagnesium, diethylmagnesium, etc., alkylaluminum hydrides such as diisobutylaluminum hydride, etc., and trialkylaluminum such as trimethylaluminum, triethylaluminum, triisobutylaluminum, trioctylaluminum, etc.

Any inert liquid organic solvent may be used as the diluent, as for example, aliphatic hydrocarbons such as hexane, heptane, isooctane, etc., cycloaliphatic hydrocarbons such as cyclohexane, aromatic hydrocarbons such as benzene, toluene, xylene, etc., or any mixture of such hydrocarbons, or halogenated aromatic hydrocarbons such as chlorobenzenes, chloronaphthalenes, etc. Other variations in the polymerization system may be applied; for example, a viscosity reducing agent such as a haloalkane or hydrogen may be added for the purpose of regulating molecular weight.

The temperature during copolymerization and homopolymerization can be as known in the art. Useful temperatures for the polymerization and copolymerization steps range from about 0 to 100° C., with the optimum temperature in each instance being determined by various factors such as the ratio of monomers in the copolymer, the ratio of polymer to copolymer, the molecular weights desired, etc.

Upon completion of the polymerization reactions the polymer slurry may be subjected to various treatments to remove catalyst residues and the polymer separated from the liquid phase by any desired means such as by filtration, decantation, centrifugation, etc. It can then be washed and steam distilled, if desired, to complete the removal of catalyst residues and to recover occluded diluent.

As has been illustrated, the invention permits the preparation of polymer slurries in which the concentration of combined polymers is relatively high. Normally for purposes of economy the final slurry should contain at least about 150 grams of polymer per liter of diluent while concentrations up to about 250 grams of polymer per liter are achievable by the present process. This contrasts quite markedly with the preparation of the copolymer alone in which case the final slurry concentration must be very low in order to permit recovery of the copolymer by conventional separation procedures.

What I claim and desire to protect by Letters Patent is:

1. The process of preparing blends of polypropylene with copolymers of ethylene and propylene which comprises copolymerizing ethylene and propylene by introducing both ethylene and propylene simultaneously into an inert liquid organic diluent in the presence of a catalyst comprising a combination of a compound of a metal selected from the group consisting of metals of Groups IV–B, V–B, VI–B, and VIII of the Periodic Table and manganese, and a hydrocarbon metal compound of a metal selected from the group consisting of alkali metals, alkaline earth metals, and aluminum to form a reaction slurry containing a solid copolymer of 97 to 85 mole percent ethylene and 3 to 15 mole percent propylene, discontinuing the introduction of ethylene, thereafter homopolymerizing propylene in the same diluent in the presence of the already formed copolymer by introducing propylene into the reaction slurry in the presence of said catalyst, each of said copolymerization and homopolymerization steps being conducted for a time sufficient to produce a reaction slurry in which said copolymer comprises about 10 to 60% by weight of the total polymer and in which the total polymer amounts to at least 150 grams per liter of diluent, and separating from the final reaction slurry a blend of stereoregular polypropylene and said copolymer.

2. The process of preparing blends of polypropylene with copolymers of ethylene and propylene which comprises homopolymerizing propylene by introducing propylene into an inert liquid organic diluent in the presence of a catalyst comprising a combination of a compound of a metal selected from the group consisting of metals of Groups IV–B, V–B, VI–B, and VIII of the Periodic Table and manganese, and a hydrocarbon metal compound of a metal of the group consisting of alkali metals, alkaline earth metals, and aluminum to form a reaction slurry containing solid stereoregular polypropylene, thereafter copolymerizing ethylene and propylene in the same diluent in the presence of the already formed homopolymer by passing ethylene and propylene simultaneously into the reaction slurry in the presence of said catalyst to form a copolymer of 97 to 85 mole percent ethylene and 3 to 15 mole percent propylene, both said homopolymerization and copolymerization steps being conducted for a time sufficient to produce a reaction slurry in which said copolymer comprises about 10 to 60% by weight of the total polymer and in which the total polymer amounts to at least 150 grams per liter of diluent, and separating from the final reaction slurry a blend of stereoregular polypropylene and said copolymer.

3. The process of claim 1 in which the catalyst is a combination of titanium trichloride and a hydrocarbon aluminum compound.

4. The process of claim 1 in which the copolymerization and homopolymerization are carried out in the presence of hydrogen.

5. The process of claim 2 in which the catalyst is a combination of titanium trichloride and a hydrocarbon aluminum compound.

6. The process of claim 2 in which the copolymerization and homopolymerization are carried out in the presence of hydrogen.

7. The process of claim 3 in which the hydrocarbon aluminum compound is an alkylaluminum halide.

8. The process of claim 5 in which the hydrocarbon aluminum compound is an alkylaluminum halide.

References Cited by the Examiner

UNITED STATES PATENTS

| | | | |
|---|---|---|---|
| 2,539,377 | 1/51 | Staudinger et al. | 260—88.6 |
| 2,862,917 | 12/58 | Anderson et al. | 260—88.2 |
| 2,882,264 | 4/59 | Barnes et al. | 260—88.2 |
| 2,957,833 | 10/60 | Baum | 260—88.0 |

FOREIGN PATENTS 577,819 Belgium.

OTHER REFERENCES

Gaylord and Mark: Linear and Stereoregular Addition Polymers, 1959, pages 120, 121, 214–215, Interscience Publishers, Inc., New York.

Alexander: Colloid Chemistry, vol. VI, 1946, pages 217–218, Reinhold, New York.

Natta: "Journal of Polymer Science," vol. 34, January 1959, pages 531–549.

MURRAY TILLMAN, *Primary Exmainer.*

DANIEL ARNOLD, LEON BERCOVITZ, *Examiners.*